Nov. 19, 1963 — L. B. LUELLEN — 3,111,549
STEEL-MAKING FURNACE
Filed July 21, 1961 — 5 Sheets-Sheet 4

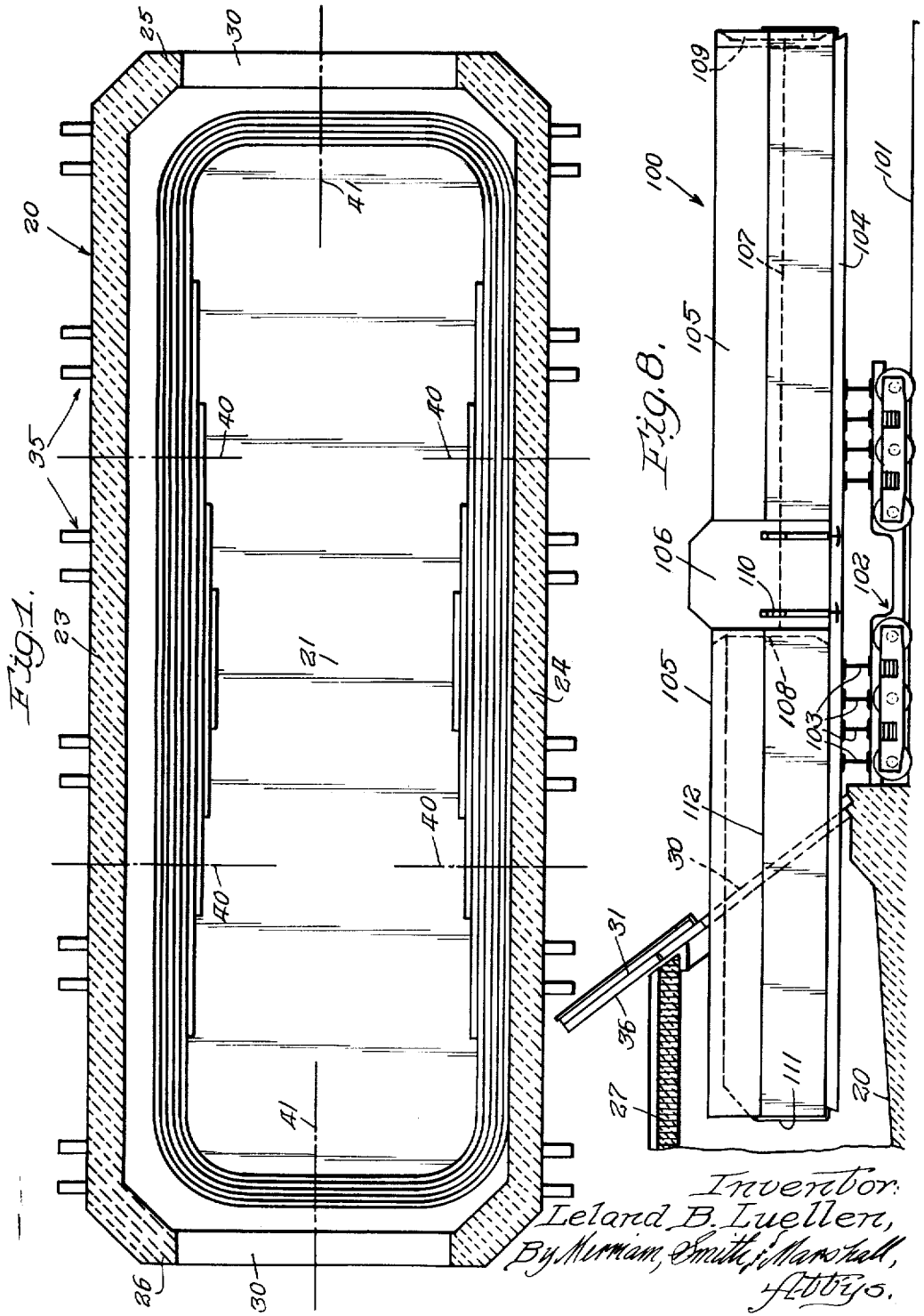

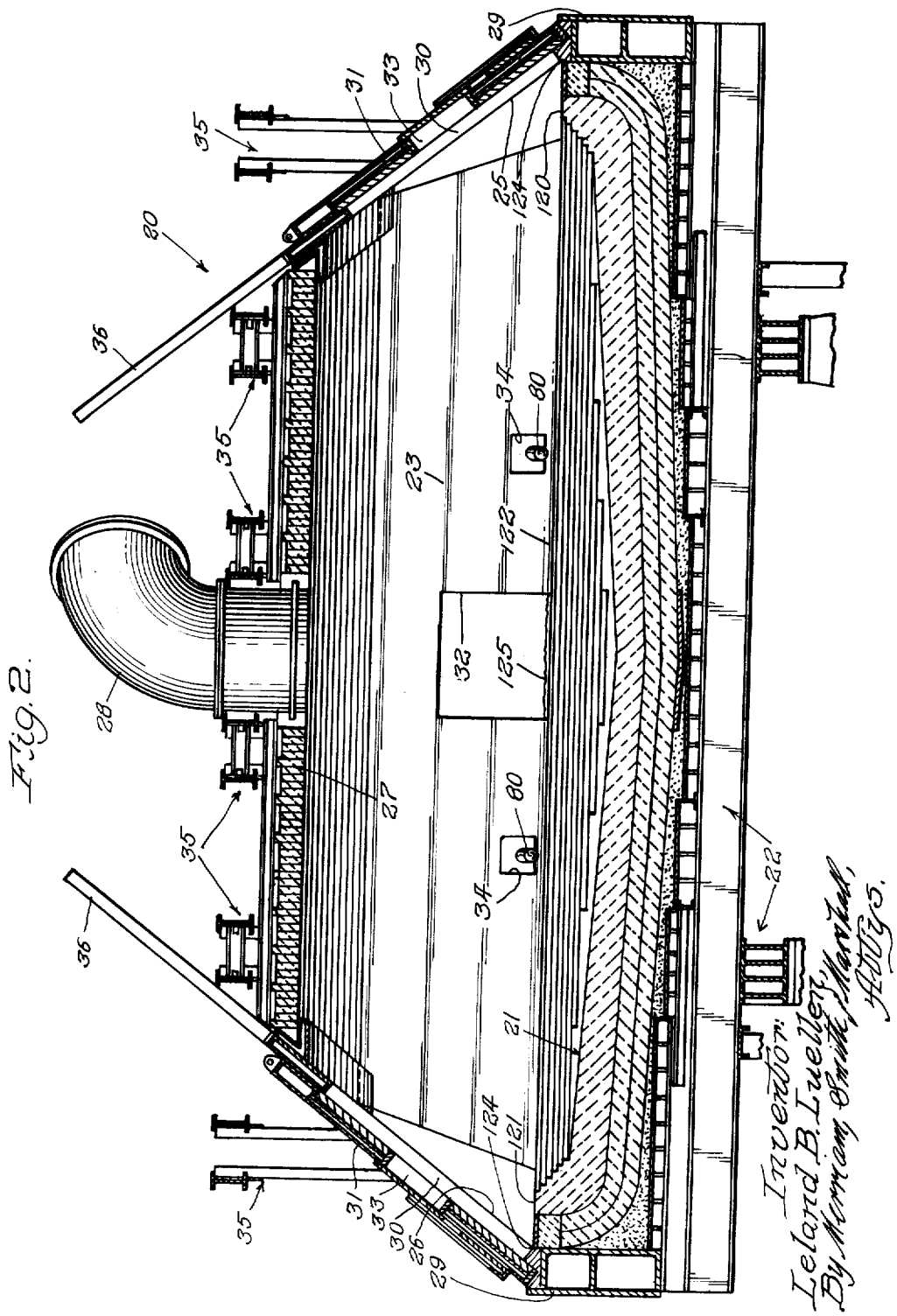

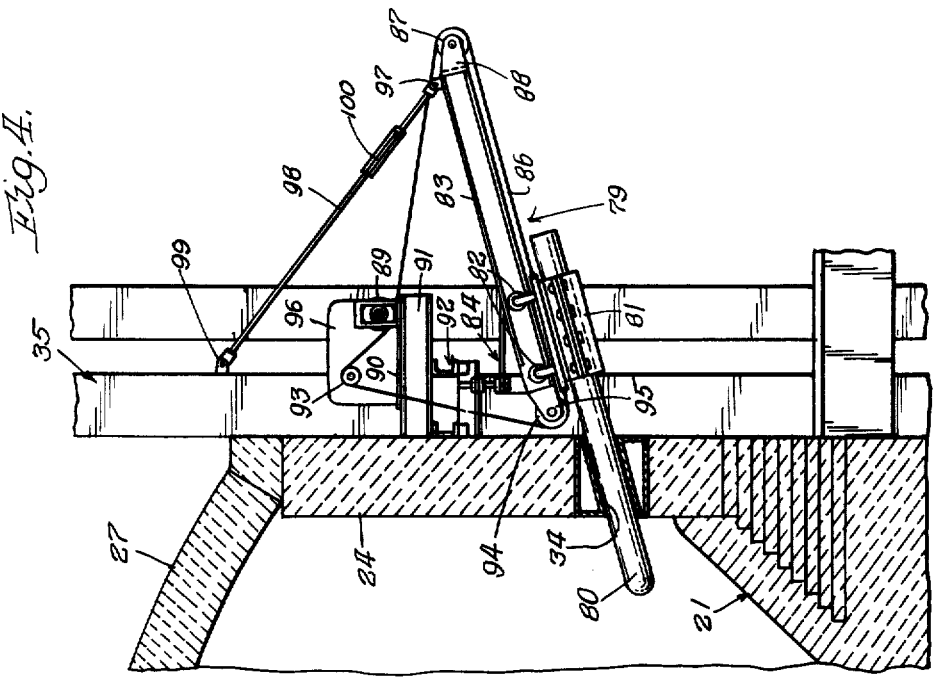

Inventor:
Leland B. Luellen,
By Merriam, Smith, Marshall
Attys.

Nov. 19, 1963  L. B. LUELLEN  3,111,549
STEEL-MAKING FURNACE
Filed July 21, 1961  5 Sheets-Sheet 5
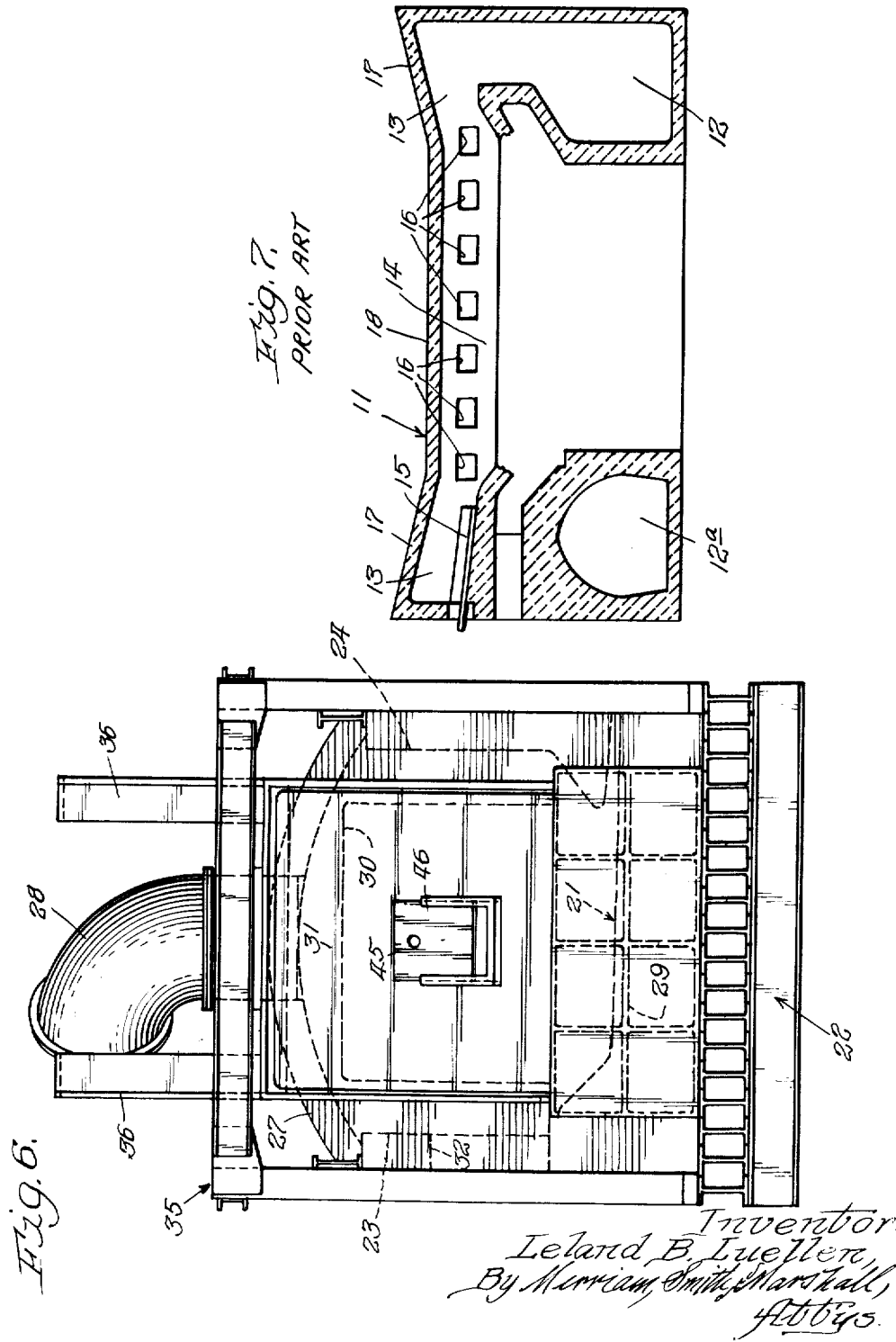
Inventor
Leland B. Luellen,
By Merriam, Smith, Marshall,
Attys.

United States Patent Office 3,111,549
Patented Nov. 19, 1963

3,111,549
STEEL-MAKING FURNACE
Leland B. Luellen, Highland, Ind., assignor to Inland Steel Company, Chicago, Ill., a corporation of Delaware
Filed July 21, 1961, Ser. No. 125,699
5 Claims. (Cl. 266—33)

The present invention relates generally to steel-making furnaces and more particularly to an open hearth-type furnace for rapidly producing steel from a charge consisting substantially of cold metallics, such as steel scrap.

Most of the steel-making furnaces in the United States are open hearth furnaces (over 85% of capacity as of January 1, 1960). However, steelmakers and engineers have long recognized that such furnaces have many undesirable characteristics and are only about 20% efficient from a fuel utilization standpoint. In conventional open hearths flames hot enough to melt cold metallics and to heat the final molten bath to tapping temperatures of about 2900° F. are impossible to obtain, regardless of the volume of fuel input, unless outside air provided for combustion is preheated to substantial temperatures; and preheating creates certain handicaps.

More specifically, preheating is performed in accordance with a well known regenerative principle whereby incoming air for combustion is preheated by being contacted with a medium which has itself been previously heated by contact with the hot waste gases leaving the furnace; and because the volumes of incoming air and of waste gases are great, relatively large passageways are necessary to conduct the incoming air from the preheating chambers to the working hearth or crucible of the furnace and to conduct the waste gases away from the hearth. These passageways (conventionally called uptakes or downtakes) are located at extensions to the furnace interior adjacent each end of the hearth, and greatly increase the size of the furnace (accounting for approximately one-third of the total furnace length) without increasing the capacity.

Moreover, the fuel burners are located so that the fuel and the stream of preheated air come together near the point of maximum air temperature which is near the ends of the furnace and thus at a remote position relative to most of the furnace burden. In addition, the whole air preheating arrangement requires that fuel be fired from only one end at a time and that the function of each end be periodically alternated from firing to exhausting. As a result, the cold metallics constituting the furnace burden melt non-uniformly along the length of the furnace with the burden portion near the ends melting fastest, and the center burden portion melting slowest. Furthermore, the melting rate at any end alternately increases and decreases as the firing goes on and off. From the standpoint of melting cold metallics and imparting heat to the bath after meltdown, this arrangement is relatively inefficient.

Another principal drawback of conventional open hearth furnaces, also arising from the conventional firing arrangement, is that the furnace structure and its hearth section, in which the actual steelmaking is done, are both relatively long as compared with their width. Thus only a small proportion of the metallics to be melted and refined lie close to the ends of the hearth, the most advantageous position from the standpoint of heat application from the burners. Under these conditions it is necessary to use a long flame, which, in addition to other drawbacks as compared with short flames, is more difficult to control as to contour and direction. Furthermore, the longer the flame the more essential it is to restrict the natural tendency of the flames to float upward. Conventional open hearth roofs must therefore be kept relatively low in order to hold the flames as close as possible to the surface of the burden. This is costly in terms of roof maintenance and repair delays. In practice, therefore, the height of the roof above the hearth is a compromise between heating effectiveness and excessive costs for roof maintenance.

A third serious handicap associated with conventional open hearth furnaces is the slow, cumbersome method utilized for charging these furnaces with cold materials. Because of a number of practical considerations, including inaccessibility of the hearth from the ends as above described and by the necessity for tapping facilities which must be located on one of the remaining two long sides of the hearth, access to the hearth is provided by a series of doors positioned along the length of the hearth on what is called the charging or front side of the furnace. The height of these doors is limited by the relatively small distance between the upper banks of the hearth and the lower edge of the roof arch. The door width is restricted by practical considerations in the design of the steel bindings and also because of clearance problems that arise between the roof and accumulating scrap as the cold charging progresses. Because of these space limitations, the doors are comparatively small and cold material charging is done by means of a large number of relatively small pans or charging boxes which are successively inserted through the doors, dumped and withdrawn. To so serve the furnace, it is necessary that trackage be located close alongside the charging side of the furnace and that no structures extend outwardly from the furnace on this charging side to interfere with movement of the cars, pans and charging machines. This charging method is very time consuming and furnace efficiency during this lengthy charging period is extremely low due to the successive additions of cold material and to high radiation losses and infiltration of cold air through the constantly opening doors.

Within the last few years, a technological development of great significance to steelmaking has taken place—the production of practically pure oxygen (called metallurgical oxygen) in large quantities and at comparatively low costs. This development has led to a number of other developments within the steelmaking field, the most important being a process for making steel by blowing this pure oxygen upon the surface of or through pools of molten iron. This causes oxidation of undesirable metalloids or impurities at a very fast rate, and the heat generated by this oxidation accumulates faster than it is dissipated, thereby enabling refinement of the molten iron into steel without the use of conventional fuel from external sources. Such processes are referred to as "oxygen steelmaking procesess," and they are providing substantial capital investment and manufacturing cost advantages over the conventional open hearth process.

A principal characteristic of these oxygen processes is that they require considerably larger percentages of molten iron as a raw material than do open hearths and their consumption of cold metallics is accordingly much more restricted. Inasmuch as the oxygen processes are being expanded at a rapid rate, it is likely that the generation of cold metallics will soon exceed future consumption rates and surpluses will develop, thereby reducing the cost of such materials. Accordingly, the furnace constructed in accordance with the present invention is intended to utilize a burden consisting substantially or entirely of cold metallics, while at the same time eliminating the low fuel efficiency and lengthy charging, melting and refining cycles inherent in conventional open hearth furnaces.

The subject furnace can make steel at much faster rates and at lower costs than can conventional open hearths, thus providing a process which can be operated competitively with the oxygen processes or, alternatively, in conjunction with oxygen processes, depending upon the comparative availability and cost of molten iron and cold metallics. Thus the two processes can be used cooperatively to the greatest overall economic advantage.

Distinguishing features of the open hearth-type furnace constructed in accordance with the present invention, as compared to the conventional open hearth furnace are as follows:

(1) The use of natural air is deliberately eliminated except to the extent unavoidably infiltrated. The principal of regeneration is abandoned essentially, although preheating of both fuel and metallurgical oxygen by heat exchanging methods may be advantageous. The air preheating system which has been relied upon to support fuel combustion is completely abandoned and the checker chambers and uptakes and port ends are eliminated. The furnace end walls, heretofore separated from the hearth by the uptakes and associated constructions, are moved inwardly into the same close relationship with the hearth as is the conventional frontwall. Such relocation of the ends substantially reduces the total furnace length without reducing the size of the hearth or crucible portion. Sloping backwalls, where such have been applied are replaced with vertical backwalls. All of these modifications result in a compact total furnace structure very much smaller and simplified in comparison with conventional furnaces and having a hearth or crucible portion much more closely enclosed by and in effect defined by the furnace walls which are substantially an upward continuation of the crucible portion.

(2) All the conventional cold charging equipment, including scrap pans, pan cars and floor charging machines, are completely abandoned. Also abandoned are all the doors along the charging side of the hearth except one, in the middle. Charging is accomplished through two very large doors located at the furnace ends and by apparatus, to be subsequently described, for rapidly introducing large volumes of cold metallics through these doors.

(3) The two alternately firing burners mounted in the extreme ends of conventional furnaces, and thus located at a relatively remote position with relation to the furnace burden, are replaced with a plurality of combination burner-oxygen lances positioned around the periphery of the hearth and adjustably mounted to permit maintaining the burners in close proximity with the burden at all stages of the heat cycle. Each burner is supplied with metallurgical oxygen to support the combustion of its fuel. The burners fire with a relatively short flame at an intensive rate, and the flame from each burner is restricted to a respective zone within which close control can be exercised over heat application and flame direction. During part of the meltdown, a total B.t.u. input three to ten times the normal input for conventional open hearths is achieved. This input is distributed among the burners (preferably six to twelve in number), although they might not all be firing at the same rate at any given time. All of these burners are interchangeably operated as oxy-fuel burners or as oxygen-blowing lances. The fuel is preferably natural gas, but oil, tar or coke oven gas could be used.

(4) In the firing system of the subject furnace, because each burner produces a short flame restricted to a relatively limited zone and under close control, it is unnecessary to keep the furnace roof low as is the case with systems producing long, uncontrollable flames. The subject furnace therefore has a considerably higher roof, relative to the foreplate line of the hearth, than conventional furnaces. Accordingly, the roof refractories are maintained farther away from the damaging burner flames; and contact between the roof and fine abrading particles thrown upwardly from the bath during the refining cycle is kept at a minimum, thereby reducing roof maintenance costs.

(5) Furthermore, the subject firing system provides relatively exact control over the furnace atmosphere in sharp contrast to conventional open hearths. By control of the fuel to oxygen ratios the atmosphere of the subject furnace may be made reducing or oxidizing at will or kept relatively constant regardless of processing reactions.

(6) Due to the elimination of natural air (no longer deliberately introduced or infiltrated in substantial volumes as in the conventional open hearth) the peak volume of waste gases is only about 30% of those of conventional open hearth heats of the same size. The waste gases may therefore be taken off by relatively small ductwork which leads to a dust and slag collecting chamber and then to a boiler.

Other features and advantages are inherent in the structure claimed and disclosed, or will become apparent to those skilled in the art from the following detailed description in conjunction with the accompanying drawings wherein:

FIGURE 1 is a horizontal sectional view of one embodiment of a steel-making furnace constructed in accordance with the present invention;

FIGURE 2 is a longitudinal vertical sectional view of the subject furnace;

FIGURE 3 is a transverse vertical sectional view of the furnace;

FIGURE 4 is an enlarged fragmentary transverse vertical sectional view showing a combination burner-lance extending through one of the side walls of the furnace;

FIGURE 6 is an end view of the subject furnace;

FIGURE 7 is a schematic view, in longitudinal vertical section, of a conventional open hearth furnace; and FIGURE 8 is a side view showing an embodiment of one type of apparatus for rapidly introducing a charge of cold metallics into the subject furnace.

Figure 5:
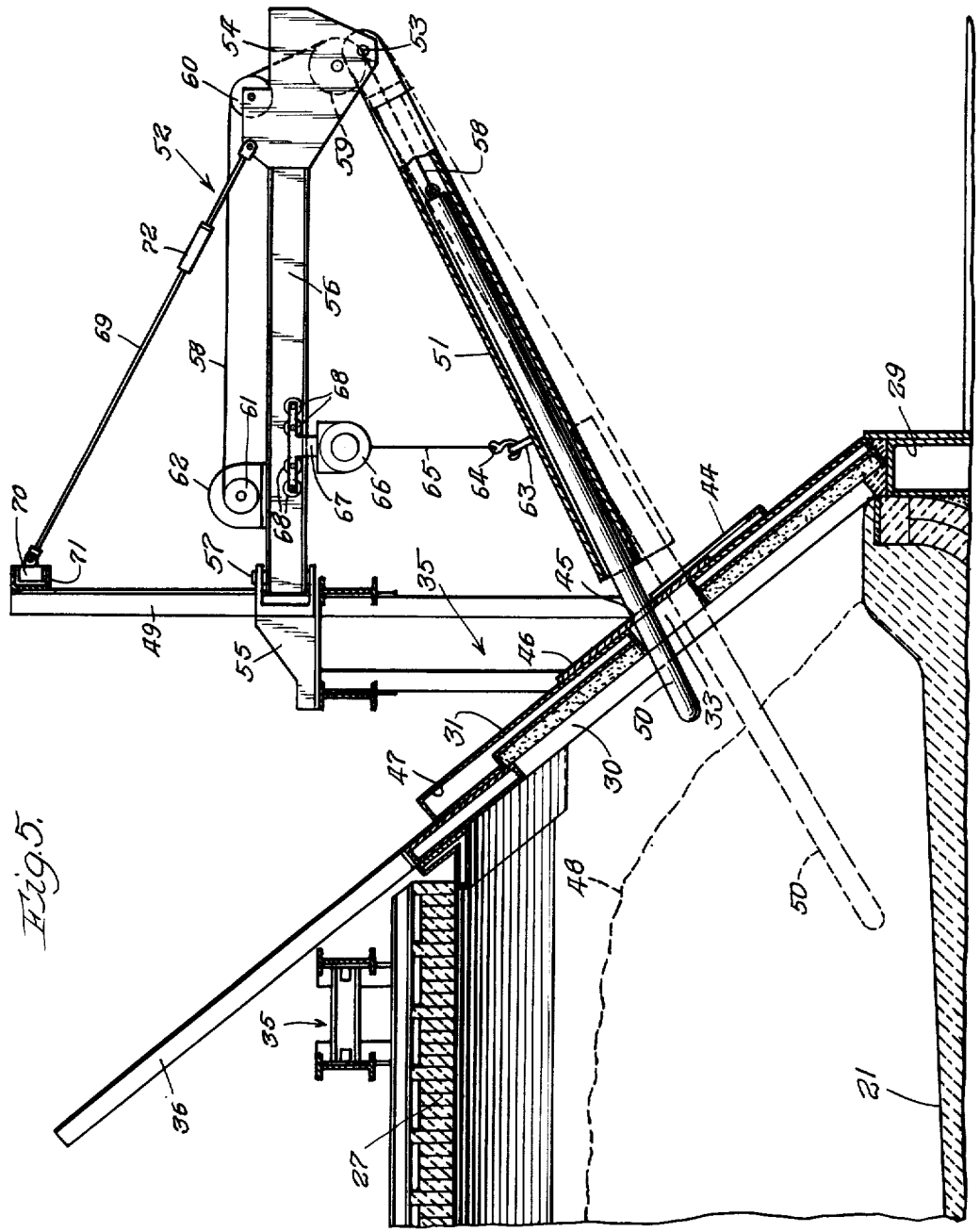
FIGURE 5 is an enlarged fragmentary longitudinal vertical sectional view showing a combination burner-lance extending through one of the end doors of the furnace.

Referring initially to FIGURE 7, there is shown schematically a conventional open hearth furnace indicated generally at 11, and including a hearth or crucible portion 14, pairs of communicating passageways 12, 12a, one at each opposite end of the furnace (only one of each passageway is shown), and enclosed areas or port ends 13 at each end of the hearth. The passageways conduct preheated air from regenerating chambers (not shown) to port ends 13 which direct the air toward the hearth and into contact with fuel being introduced through burners 15 extending into each of the port ends (only one being shown). Both the passageways and the port ends alternately act to conduct combustion air to the hearth and waste gases from the hearth with their function at any one time being determined by the direction of furnace firing. The multiplicity of side doors through which charging takes place are designated as 16. The furnace roof usually consists of hood sections 17 over the port ends, and a main roof section 18 which covers hearth 14 and is lower than hood sections 17 for reasons previously explained.

Referring now to FIGURES 1, 2 and 3, there is shown an embodiment of a furnace, indicated generally at 20, constructed in accordance with the present invention, and comprising a bottom crucible or hearth portion 21 constructed from conventional refractory material arranged in several layers in a conventional manner familiar to those skilled in the art. Furnace 20 also includes front and back side walls 23, 24, respectively, a pair of end walls 25, 26, and an arched roof 27 covering the crucible and terminating at said end walls and at said front and back side walls. It should be noted from FIGURE 2 that the height of roof 27 may be at least the same over the middle of the crucible as at the junction of the roof with end walls 25, 26. Both the end walls and the side walls are constructed from conventional refractory material and in a manner familiar to those skilled in the art.

With reference to FIGURES 2 and 3, the upper peripheral limits of the crucible portion 21 are defined by hearth bank tops substantially at the foreplate line of the furnace, said bank tops consisting of end bank tops 120, 121 and side bank tops 122, 123. End walls 25, 26 as well as side walls 23, 24, extend upwardly substantially as a continuation of the crucible portion, with only an insubstantial set back, in the form of end bank tops 120, 121, separating the end walls from the crucible portion.

In the illustrated embodiment, a duct or conduit 28 extends through roof 27 for carrying off waste gases generated during the steel-making process. Although duct 28 is shown in a central location on the roof, duct 28 may be located elsewhere on the roof or in the back wall or front wall as individual conditions and operating practices may require. Generally duct 28 extends downwardly through the charging floor to a slag chamber (not shown) and then to a waste heat boiler (not shown).

Surrounding the lower portion of the crucible is a water jacket 29 conventional in furnace construction. In each end wall 25, 26 is a relatively large doorway 30 occupying the greater portion of its end wall and normally covered by an end door 31 movable between open and closed positions along door tracks 36. In front side wall 23 is a relatively small doorway 32 also normally covered by a door (not shown). Each end door 31 has a port 33 for receiving a combination burner-oxygen lance, to be subsequently described in detail, and each of the side walls 23, 24 has a pair of ports 34, also for receiving a combination burner-lance. It should be noted that the subject furnace includes only a single doorway along the front side wall 23 of the furnace (corresponding to the charging side in the conventional open hearth) and that the passageways and port ends (such as 12, 12a and 13 in FIGURE 7) of conventional open hearths have been completely eliminated. In addition, the bottom edges 124, 125 of end doorways 30 and side doorway 32, respectively through the charging floor to a slag chamber (not furnace as defined by the hearth bank tops 120, 121 and 122 with only a 2 to 4 inch sill separating a doorway lower edge from the foreplate pline in some embodiments.

Furnace bottom or crucible portion 21 is supported by a conventional arrangement of beams and other members indicated generally at 22, and the numeral 35 indicates generally uprights and other members conventionally utilized for supporting or bracing purposes in conjunction with open hearth type steel-making furnaces.

In the illustrated embodiment end walls 25, 26 are depicted as converging upwardly toward each other. If desired, the end walls may be disposed vertically and mutually parallel. However, the converging relationship is preferable because this eliminates substantial waste space at opposite end portions of the furnace, which space serves no operational function and absorbs heat from other portions of the interior of the furnace.

Referring to FIGURE 1, the numeral 40 indicates the center lines of nozzles or combination burner-lances extending through ports 34 in the side walls of the furnace and the numerals 41 indicate the center lines of combination burner-lances extending through ports 33 in the end doors of the furnace. Although the illustrated embodiment contemplates six burners arranged peripherally in the manner illustrated in FIGURE 1, this number can be varied. Furthermore, the center lines 40 of the side burners need not be in alignment with each other, and need not be parallel. In another embodiment they may be staggered with relation to each other and angled in different directions.

By utilizing the peripheral arrangement shown in FIGURE 1, every portion of the burden in the furnace hearth is within close proximity to a burner. Accordingly, there is uniform meltdown and heating of all burden portions no matter where located. Furthermore, all of the burners may be fired at once, or various combinations of burners may be fired, depending upon the conditions existing within the furnace. It is advantageous to locate the burners in positions extending through the walls of the furnace, rather than extending downwardly through the roof. Maintenance is faster and less costly because of easier accessibility. Overhead clearance problems are eliminated or largely modified. The flame is applied near the base of the cold charge and the unavoidable upward drift of the hot gases passes through or over the upper portions of the burden in contrast to roof-mounted units where the flame is applied on top of the cold charge and the upward reaction of the gases is away from the materials being heated. Other advantages apply when the metallics are largely or completely melted and soft flames are desired or where maximum contact with the bath from both surface area and time-interval standpoints is desirable. In such cases, side-mounted units more effectively provide a surface sweeping action than do vertical-mounted units. Under comparable conditions, turbulence of molten metal and slag are also less.

Referring to FIGURE 5, end door 31 includes a water jacket 47 and an outer port-covering plate 46 slidable in and out of a housing 44. Plate 45 is slidable to cover port 33 in door 31 and includes an opening 45 for receiving the end burner 50. In operation, burner 50 extends through opening 45 and port 33 and directs a flame at burden 48. That portion of burner 50 outside the furnace extends slidably within a housing 51 connected to apparatus, indicated in one embodiment generally at 52, for adjusting the position of burner 50 relative to burden 48.

More specifically, that end of housing 51 remote from the furnace is pivotally mounted at 53 to an irregularly shaped plate 54 connected to one end of a horizontally extending rail or member 56, the other end of which is pivotally mounted at 57 to a bracket-like element 55 secured to an extension 49 on upright 35. Connected to irregularly shaped plate 54 is one end of a rod 69, the other end of which is connected at 70 to a bracket attached to upright extension 49. Rod 69 also includes a turn buckle 72 for adjusting the tension in this rod.

Secured to housing 51 between opposite ends thereof is a ring 63 engaged by a hook 64 connected to one end of a cable 65, the other end of which is wound around a reel 66 mounted on a supporting element 67 having rollers 68 which are movable along a trackway on rail 56. Winding or unwinding of cable 65 around reel 66 causes housing 51 with burner 50 to rotate about the axis of pivotal mounting 53 and thereby change the angular inclination of burner 50 relative to burden 48.

Connected to that end of burner 50 remote from the furnace is another cable 58 extending around a pulley 59 mounted on the lower end of plate 54, around a second pulley 60 mounted on the upper end of plate 54, and terminating at a reel 61 mounted on a bracket 62 located atop member 56. Reel 61 can be wound or unwound to vary the distance between the inner end of burner 50 and the furnace burden 48. In other words, if reel 61 is unwound, the burner 50 moves axially toward burden 48, whereas when reel 61 is wound up, burner 50 is moved axially away from burden 48 and eventually is completely withdrawn from the furnace.

Burner 50 is withdrawn from the furnace when it is desired to open end door 31 so as to charge the furnace in a manner to be described subsequently. After the burner is withdrawn from the furnace, the entire burner assembly, including burner 50, housing 51 and adjusting structure 52, is rotated about the axis of pivotal mounting 57 to a position in which it does not interfere with the introduction of material through doorway 30; that is, to a position outside the path of projection of the doorway on a vertical plane.

The position of burner 50 shown in the dash-dot lines in FIGURE 5 is the position to which it is adjusted when the burden has been melted down. In this position the burner blows oxygen alone onto the surface of the bath so as to oxidize the metalloid impurities therein. During this stage of the operation no fuel is introduced through burner 50. Fuel and oxygen are both supplied to burner 50 by conventional connections (not shown).

Referring now to FIGURE 4, there is shown a typical embodiment of a burner 80 extending through one of the side walls (e.g. back side wall 24) of the furnace, and of apparatus, indicated in one embodiment generally at 79, for repositioning burner 80 in an axial direction so as to move it closer to or farther away from the burden within the furnace.

More specifically, secured around burner 80 adjacent the end thereof remote from the furnace is a collar 81 upwardly from which extend roller means 82 movable along a trackway member 83 connected by structure indicated generally at 84 to an upright 35. Attached to that end of collar 81 remote from the furnace is one end of a cable 86 which extends around a pulley 87 mounted on an extension 88 of member 83, around a capstan or reel 89, around another pulley 93, around still another pulley 94 and terminating at that end of collar 81 adjacent the furnace. Capstan 89 is mounted on a platform 90 supported by a horizontally extending member 91 connected by structure indicated generally at 92 to upright 35. Pulley 93 is mounted on a flange 96 extending upwardly from platform 90, and pulley 94 is mounted on an extension 95 of frame member 83. Turning capstan 89 moves cable 86 and causes movement of burner 80 along its axis either towards or away from the burden within the furnace by virtue of the fact that collar 81 to which burner 80 is attached travels back and forth along member 83 in response to movements of cable 86.

If desired, side burner 80 can be operated with port means and position-adjusting apparatus similar to that embodiment previously described for use with end burner 50. Thus, in addition to being axially movable, the angular position of the side burner relative to the burden would also be adjustable.

As indicated in FIGURE 6, the doorways 30 in the end walls occupy the greater portion of the end walls. This is to enable the introduction of large quantities of cold metallics to the interior of the furnace in a relatively short time, utilizing charging apparatus, an embodiment of which is indicated generally at 100 in FIGURE 8. More specifically, charger 100 moves along a floor track 101 and includes railroad-type trucks 102 on top of which rest floor-supporting beams 103 for carrying a floor 104 upwardly from which extend walls 105 defining a pair of container or hopper portions between which is located a central portion 106 containing conventional means (not shown) for actuating a ram arm 107 having a pair of ram heads 108, 109 at opposite ends thereof.

A container portion on the charging apparatus holds enough scrap to provide up to half of the metallic charge. Accordingly, if the scrap in two container portions is introduced into the furnace, one portion through each door, then the furnace will contain a full charge. This is accomplished by running floor tracks 101 all the way up to each respective end wall of the furnace and positioning a pair of chargers 100 on the tracks, one at each end of the furnace. After filling the charger hopper portion not containing ram arm 107, the furnace end door is opened, the charger is moved into the position shown in FIGURE 8, a hopper discharge door 111 (now within the furnace) is opened by actuating a rod 112 connected to a lever 110 positioned alongside central portion 106, and the machinery within central portion 106 is actuated to move the ram arm 107 to the left as viewed in FIGURE 8. This causes ram head 108 to move toward the interior of the furnace, thereby pushing the charge off the floor 104 of the hopper portion and into the furnace. Simultaneously charger 100 is backed away from the furnace (to the right as viewed in FIGURE 8) so that floor 104 is withdrawn from under the charge as ram 108 pushes the charge.

In this manner an entire container charge, constituting one half of the furnace burden, can be introduced into the furnace and distributed evenly across the furnace bottom in a relatively short time. The same operation is performed at the other end of the furnace by a similar apparatus. Utilizing this apparatus and method, the entire furnace can be charged in one to three minutes as contrasted with one to three hours for the long, tedious charging procedure utilized to charge the conventional open hearth furnace.

Because the furnace end doors are open for only a few minutes, infiltration of air into the furnace and cooling of the interior of the furnace are kept to a minimum. After the charging apparatus is moved from the charging position shown in FIGURE 8, the container portion located to the right in FIGURE 8 is filled with a charge of material. This is possible because the ram arm 107 is now located in the container portion located to the left and the ram head 109 is adjacent central portion 106. Apparatus 100 can then be used to charge another furnace (not shown) located to the right of the apparatus 100, as viewed in FIGURE 8.

It should be noted that the scrap in a filled hopper portion is contained in substantially the same configuration and dimensions as it will occupy when lying evenly distributed along that half of the furnace hearth into which it will be discharged. Accordingly, the vertical dimension of the end doorway (and of the door) should exceed the height of the scrap charge as contained by the hopper portion or as discharged into the furnace; and the portion of the furnace roof under which the charging apparatus moves must be at least as high as the top of the scrap charge when the latter is contained in the charger's hopper portion.

Immediately following placement of the cold metallics as described, the end burner-lances 50 are swung into the operating position shown in solid lines in FIGURE 5, and they, together with side burners 80 start firing into the sides of the burden around the periphery thereof. The B.t.u. input from each individual burner is less than that of a single burner in conventional furnaces, but, collectively, the B.t.u. input is from three to ten times greater. The flames from burners 50 and 80 are relatively short and sharp with temperatures more than 1000 degrees F. above the temperature of the long flames employed by conventional open hearths, even when the latter have the benefit of oxygen enrichment techniques. The capacity of the furnace refractories to accept such high firing rates, and the effectiveness of heat transfer to the burden in the earlier stages of the heat is of a substantially higher order than has heretofore been possible because the "heat sink" created by rapid placement of the large amount of cold metallics creates conditions favorable to these results. In addition, other factors conducive to much more rapid heat transfer are also collectively provided to a degree not previously achieved. For example, each burner operates in a relatively restricted zone within which close control may be exercised over flame contour and direction to decrease the heat load upon the brickwork and concentrate it upon the burden. The flame "thrust" effect and the area of burden surface covered by flame is also much greater for any given B.t.u. input than in conventional firing systems.

When heating and melting of the cold metallics has proceeded to a suitable point, an additional charge, in the form of molten iron, may be added, if desired, by ladle through the small front door, or through the end doors under some conditions. Immediately following addition of the molten iron, the two end burner-lances 50 start blowing oxygen alone upon the surface of the charge. During this oxygen blowing period, several or all of the side burner-lances 80 stop fuel application and are utilized for blowing oxygen closely across the surface of the bath to burn the CO to $CO_2$, substantially at the surface. The release of the intensive heat created by this reaction takes place at the most advantageous point for heat transfer to the metallics and further away from the refractories than is the case with conventional furnace operation or burner arrangement.

When the bath within the furnace has been completely refined, it is tapped and the furnace is then made ready for the next heat. The necessary bottom and tap hole maintenance will then be performed through the two end doors and through the small center door.

There has thus been described a steel-making furnace of the open hearth type, which furnace utilizes a charge consisting substantially of cold metallics and which produces steel much faster and cheaper than the conventional open hearth furnace, and with lower construction and maintenance costs.

The foregoing detailed description has been given for clearness of understanding only, and no unnecessary limitations should be understood therefrom, as modifications will be obvious to those skilled in the art.

What is claimed is:

1. A furnace for melting and refining a charge consisting substantially of cold metallics, said furnace comprising:

a bottom crucible portion terminating at an upper peripheral limit thereof;

a front wall, a back wall, and a pair of end walls;

each of said walls extending upwardly from the crucible portions' upper peripheral limit, substantially as a continuation of the crucible portion, and in a direction other than outwardly;

the inner surface of each of said walls being set back in substantially from the crucible portion at the latter's upper peripheral limit;

said walls defining the outermost limits of said furnace around the entire periphery thereof;

a roof covering said crucible portion and terminating at said end walls and said front and back walls;

the height of said roof over the center of the crucible portion being at least as great as the height of the roof at the end walls;

a charging doorway in each of said end walls;

a door covering each of said doorways;

each of said doorways occupying the greater portion of its respective end wall;

each doorway having a height substantially greater than the height of said crucible portion;

a plurality of burner-oxygen lances in said front wall and in said back wall;

each of said burner-oxygen lances extending inwardly, through its respective wall, beyond the upper peripheral limit of said crucible portion;

and a pair of burner-oxygen lances, each extending through a respective one of said end doors, into said furnace, beyond the upper peripheral limit of the crucible portion.

2. A furnace as recited in claim 1 wherein:

the bottom edge of each end wall doorway is at a level corresponding substantially to the upper peripheral limit of said crucible portion.

3. A furnace as receited in claim 1 and comprising:

a single doorway in said front wall;

said single doorway being relatively small in comparison to the charging doorways in the end walls;

said back wall being devoid of doorways;

and a single opening in the upper portion of said furnace for carrying away gases from the furnace interior.

4. A furnace as recited in claim 1 and comprising means mounting each of said burner-oxygen lances for axial movement, to enable withdrawal from and insertion into the furnace.

5. A furnace as recited in claim 1 and comprising:

means mounting said end doors for slidable movement between open and closed positions;

means mounting said burner-oxygen lances at the end doors for axial movement to a withdrawn position outside the furnace;

and means mounting said withdrawn end burner-oxygen lances for pivotal movement to a position outside the path of projection of the doorway on a vertical plane.

References Cited in the file of this patent

UNITED STATES PATENTS

| | | |
|---|---|---|
| 1,160,806 | Wuestner et al. | Nov. 16, 1915 |
| 1,894,249 | Williams | Jan. 10, 1933 |
| 2,084,830 | Barnard et al. | June 22, 1937 |
| 2,182,497 | Longenecker | Dec. 5, 1939 |
| 2,294,390 | De Long et al. | Sept. 1, 1942 |
| 2,542,684 | Laverdisse et al. | Feb. 20, 1951 |
| 2,612,366 | Wheeler | Sept. 30, 1952 |
| 2,818,247 | Francis | Dec. 31, 1957 |

FOREIGN PATENTS

| | | |
|---|---|---|
| 820,454 | Great Britain | Sept. 23, 1959 |

UNITED STATES PATENT OFFICE
CERTIFICATE OF CORRECTION

Patent No. 3,111,549                          November 19, 1963

Leland B. Luellen

It is hereby certified that error appears in the above numbered patent requiring correction and that the said Letters Patent should read as corrected below.

Column 5, line 37, for "through the charging floor to a slag chamber (not" read -- , correspond substantially with the foreplate line of the --; column 9, line 30, for "in substantially" read -- insubstantially --.

Signed and sealed this 28th day of April 1964.

(SEAL)
Attest:
ERNEST W. SWIDER                              EDWARD J. BRENNER

Attesting Officer                                Commissioner of Patents